(12) United States Patent
Haymoz

(10) Patent No.: US 9,114,938 B2
(45) Date of Patent: Aug. 25, 2015

(54) DEVICE AND METHOD FOR CONVEYING PACKAGED GOOD AND/OR BULK GOODS

(75) Inventor: Robert Haymoz, Uzwil (CH)

(73) Assignee: Bühler AG, Uzwil (CH)

( * ) Notice: Subject to any disclaimer, the term of this patent is extended or adjusted under 35 U.S.C. 154(b) by 88 days.

(21) Appl. No.: 14/113,301

(22) PCT Filed: May 3, 2012

(86) PCT No.: PCT/EP2012/058161
§ 371 (c)(1),
(2), (4) Date: Oct. 22, 2013

(87) PCT Pub. No.: WO2012/156209
PCT Pub. Date: Nov. 22, 2012

(65) Prior Publication Data
US 2014/0041995 A1    Feb. 13, 2014

(30) Foreign Application Priority Data

May 13, 2011    (EP) .................................. 11166067

(51) Int. Cl.
| | | |
|---|---|---|
| B65G 47/34 | (2006.01) | |
| B66C 21/00 | (2006.01) | |
| B65G 41/00 | (2006.01) | |
| B66C 17/00 | (2006.01) | |
| B66C 11/20 | (2006.01) | |

(52) U.S. Cl.
CPC .............. *B65G 41/002* (2013.01); *B66C 11/20* (2013.01); *B66C 17/00* (2013.01); *B66C 21/00* (2013.01)

(58) Field of Classification Search
CPC ........ B65G 17/20; B65G 17/22; B65G 47/60; B65G 47/61; B66C 17/00; B66C 21/00
USPC ............. 198/465.4, 468.6; 212/196, 312, 314
See application file for complete search history.

(56) References Cited

U.S. PATENT DOCUMENTS

| | | | | |
|---|---|---|---|---|
| 700,162 | A * | 5/1902 | Wiley ............................ | 212/288 |
| 3,575,300 | A * | 4/1971 | Durand ......................... | 212/228 |
| 3,834,552 | A | 9/1974 | Lofink | |
| 7,344,017 | B1 * | 3/2008 | Taguchi ..................... | 198/468.6 |
| 7,886,920 | B2 * | 2/2011 | Colley et al. .................. | 212/316 |
| 7,891,967 | B2 * | 2/2011 | Brussel ......................... | 425/446 |
| 8,789,682 | B2 * | 7/2014 | Fisher ......................... | 198/465.4 |

FOREIGN PATENT DOCUMENTS

| | | |
|---|---|---|
| DE | 1280153 | 10/1968 |
| DE | 1556023 | 7/1970 |
| DE | 19530112 | 2/1997 |
| NL | 6514508 | 5/1967 |

* cited by examiner

*Primary Examiner* — James R Bidwell
(74) *Attorney, Agent, or Firm* — Davis & Bujold, P.L.L.C.; Michael J. Bujold

(57) ABSTRACT

A device for conveying packaged goods and/or bulk goods from and/or into a transport device includes a boom. The boom has a conveying unit, which is mounted to be vertically movable, for conveying the packaged goods and/or the bulk goods, and a force transmission unit. The conveying unit and the drive are arranged between fastening devices and/or between force deflection devices. The conveying unit can be moved substantially vertically by the drive.

14 Claims, 7 Drawing Sheets

DEVICE AND METHOD FOR CONVEYING PACKAGED GOOD AND/OR BULK GOODS

Figure 1:
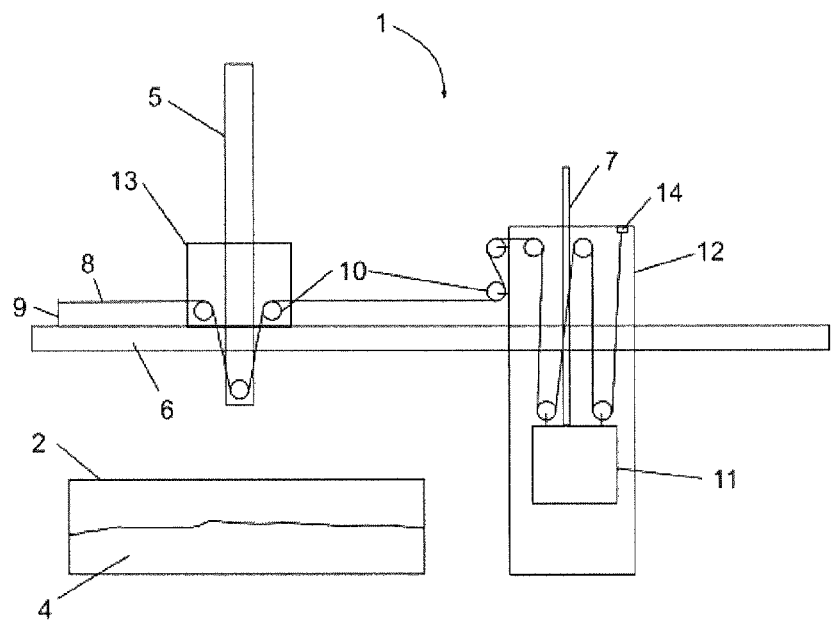

The present invention relates to the field of conveying packaged goods and/or bulk goods from and/or into a transport device with the features of the preambles of the independent claims.

From DE 195 30 112 A1 a method and device are known for loading or unloading a ship. Here, by way of example, using continuous ships' unloaders, a crane is positioned with a so-called "marine leg" in the loading or unloading area of the ship in order to set down or pick up the material to be conveyed.

Devices of this kind for continuously loading and unloading are also known by way of example from the company Buhler.

Devices of this kind however have in some circumstances the drawback that the positioning of the device for loading and unloading cannot be carried out at a sufficiently high speed since often heavyweight masses have to be moved. Furthermore as a result of the masses which are to be moved, powerful drives are required at the device in order to position the corresponding conveying device. Such drives are generally more expensive and consume more energy during operation.

From WO 00/21826 A1 an apparatus is known for unloading and loading ships by means of standardized platforms. Large loads are hereby moved up to and away from a ship by means of counterweights.

This device has however the drawback that access to the ships' loads inside a ship is possible only with difficulty and that bulk materials cannot be readily unloaded or loaded.

It is therefore an object of the present invention to overcome the drawbacks of the known systems, more particularly thus to provide a device and a method with which a transport device and more particularly a ship can be loaded and unloaded with packaged goods and/or bulk goods wherein the conveying device permits a reliable and safe positioning relative to the transport device and moreover requires no powerful drives for positioning the conveying device. A further object of the present invention is to provide a device and a method with which a transport device can be loaded and unloaded cost-effectively and with favorable energy consumption.

These objects are achieved by a device and a method according to the independent claims.

The device according to the invention for conveying packaged goods and/or bulk goods from and/or into a transport device, more particularly a ship, comprises a boom. This boom has at least one substantially vertically movable conveying unit for conveying the packaged goods and/or the bulk goods, and a force transmission unit. The device has a first fastening device and a second fastening device and/or at least one first and one second force deflection unit or any combinations thereof for the force transmission unit. The conveying unit and the drive are arranged between the first fastening device and the second fastening device and/or between the first and the second force deflection devices or arbitrary combinations thereof when used as intended, relative to at least one direction defined along the force transmission unit. The first fastening device is more particularly mounted on the boom. The force transmission unit is designed so that the conveying unit is movable substantially vertically at least by means of the drive.

By the phrase "packaged goods and/or bulk goods" is meant in the sense of the present application the conveyance of packaged goods and bulk goods, only of packaged goods or only of bulk goods. In the sense of the present application this interpretation of the variations embraced with the "and/or" phrase is to be understood from here on and in the following.

The phrase "a first fastening device and a second fastening device and/or at least a first and a second force deflection unit or arbitrary combinations thereof" means in the sense of the present application that the device has one of the following combinations:

a first fastening device and a second fastening device; a first fastening device and a second fastening device and at least a first and a second force deflection unit; a first fastening device and at least a first and a second force deflection unit; a first fastening device and a second fastening device and at least a first force deflection unit.

The word "vertical" means in the sense of the present application the direction which is parallel to the gravitation action. By the term "horizontal" is meant in the sense of the present application the direction which stands perpendicular to the direction of the gravitational effect.

By the phrase "substantially vertical" is meant in the sense of the present application an angle of ±20° to the vertical direction, preferably ±10° and more particularly preferred an angle of ±5°.

By force transmission unit is meant in the sense of the present application any unit which can transfer a force, such as by way of example, chains, rod linkage, cable or ropes or combinations thereof, wherein this list is not conclusive.

By a first and/or a second fastening device for the force transmission unit is meant in the sense of the present application any device with which a force transmission unit can be fastened on a device, such as by way of example a boom. This can be by way of example screws, hooks, knots or even adhesive. The first and/or second fastening device can be formed by way of example also as a winch for adapting the length of the force transmission unit, more particularly also with a unit for exerting force along the force transmission unit and/or a unit for locking the length of the force transmission unit.

By force deflection unit is meant in the sense of the present application a unit for deflecting a force, more particularly a guide pulley.

More particularly the first fastening device and the second fastening device can be arranged in one fastening housing each or in a common fastening housing.

More particularly the first fastening device and the second fastening device can be formed as just one common fastening device for the in particular loop-shaped force transmission unit. In other words, two ends of the force transmission unit can thus be fastened on the just one common fastening device so that a loop-shaped force transmission unit is formed.

By a direction defined along the force transmission unit is meant a direction substantially congruent with the force transmission unit.

In the sense of the present application a drive which is mounted on the conveying unit and is not connected to the force transmission unit is arranged along the direction defined by the force transmission unit between the first fastening device and the second fastening device.

The drive can be formed by way of example as an electric drive, an internal combustion engine or also as a hydraulic drive.

By the term "packaged goods" is meant in the sense of the present application that article which can be transported as one piece, such as by way of example packing drums, crates, pallets or even ships' containers.

By the term "bulk material" is meant in the sense of the present application a granular or even particled article which is present in a loose bulk form and is in particular capable of flowing and/or can be conveyed by way of example by means of screw conveyors.

The device according to the invention now has the advantage that with it packaged goods and/or bulk goods can be conveyed out from and/or into a transport device. This type of arrangement of conveying unit, fastening devices, force transmission unit as well as the drive enables high flexibility and accurate and rapid positioning of the conveying unit in order also to reach by way of example ships' loading areas which have difficult access but which can now be loaded and/or unloaded efficiently.

By way of example it is advantageous that during unloading of a ship the first fastening device for the force transmission unit is mounted on the side of the boom facing the ship, and the drive which is connected to the boom via the force transmission unit is mounted on the side remote from the ship. This has the result that the more bulky parts of the device such as by way of example the drive do not impede the loading and/or unloading of the ship and moreover the positioning can take place precisely essentially in the vertical direction of the conveying unit since here also the drive for the horizontal movement of the conveying unit along the boom is uncoupled from the vertical movement.

The force transmission unit is preferably designed at least in some sections as a block and tackle.

This has the advantage that only by way of example lower power drives are necessary for the substantially vertical movement of the conveying unit with a corresponding configuration of the block and tackle. The drive must however hereby reach a greater lift than the maximum substantially vertical movement of the conveying unit.

With the configuration of the force transmission unit at least in some sections as a block and tackle it is however also advantageously possible to design the block and tackle so that the drive for the substantially vertical movement of the conveying unit has a lift which is smaller than the substantially vertical movement. By way of example the absolute value of the lift can amount to approximately 50% of the absolute value of the maximum substantially vertical movement. This has the advantage that the drive must indeed be designed as a more powerful drive which however need only reach a lower lift, which makes the drive more cost-effective.

By "lift" of a drive is meant in the sense of the present application the maximum travel path over which the drive can position an element directly without any further force transmission unit or even any force transformation unit.

Preferably the force transmission unit is designed as at least a cable, a rope, a chain or combinations thereof with guide elements. More particularly the force transmission unit has a fixed length. The force transmission unit is more particularly designed in one piece, more particularly of metal. The guide elements are formed in particular as guide rollers and/or guide pulleys.

In the sense of the present application by a one-piece cable is meant by way of example a cable which is in one piece in the longitudinal direction. In the sense of the present application a cable which is formed from a plurality of filaments, is likewise a one-piece cable.

The design of the force transmission unit as at least a cable, a rope, a chain or combinations thereof with guide elements has the advantage that the force transmission unit is made flexible and space-saving and can be simply adapted by means of guide elements to the corresponding requirements. Furthermore a force transmission unit of this kind is convenient in manufacture and reliable in operation.

Particularly preferred is at least one of the following components fastened on and/or in a housing: boom, drive, first fastening device, second fastening device, force deflection unit(s).

This has the advantage that the device can be made flexible in dimensions in order to be adapted to the different transport devices. Furthermore parts of the devices can be arranged on and/or in this housing.

More particularly the drive and the boom are mounted on and/or in the housing.

This has the advantage that the drive is mounted adjacent to the boom and thus the force transmission unit, such as by way of example the cable, can be made short which is cost-effective and increases the reliability.

It is especially preferred if the drive is mounted on and/or in the conveying unit.

This has the advantage that through this arrangement of the drive the conveying unit can inter alia be driven directly which makes the positioning of the conveying unit faster and more precise.

The device preferably has a counterweight which is mounted at least substantially vertically movable and which is connected to the drive and/or is mounted between the first fastening device and the second fastening device and/or between the first and second force deflection unit or any combinations thereof, wherein the counterweight when used as intended is movable in particular substantially vertically opposite the conveying unit. In other words the drive is designed so that this moves the counterweight and/or the conveying unit substantially vertically whereby the conveying unit and the counterweight are moved substantially vertically opposite one another by means of the force transmission unit.

This has the advantage that through this configuration with the counterweight only a less powerful drive is necessary for positioning the conveying unit than without a counterweight. This makes the device more cost-effective in its production and operation compared with the prior art and enables a more precise and faster positioning of the conveying unit relative to the bulk goods and/or packaged goods. By way of example a substantially floating conveying unit can thereby be formed whose weight does not bear on the ship's floor whereby on the one hand vertical compensating movements relative to the ship are improved and on the other hand the serious risk of collision between the ship and conveying unit is also reduced.

More particularly the counterweight is arranged between the conveying unit and the second fastening device in relation to the direction defined along the force transmission unit. By way of example a drive which is mounted on the thus arranged counterweight and is not connected to the force transmission unit, is arranged along the direction defined by the force transmission unit in the sense of the present application between the first fastening device and the second fastening device and/or between the first and the second force deflection unit or arbitrary combinations thereof.

More particularly thus at least one of the following arrangements is preferred: arrangement of the drive on the conveying unit and of the counterweight between the first fastening device and the second fastening device and/or between the first and the second force deflection unit or arbitrary combinations thereof; arrangement of the drive on the counterweight which is arranged between the first fastening device and the second fastening device and/or between the first and the second force deflection unit or any combinations thereof.

Through suitably selecting the force transmission unit and the force deflection units it is possible by way of example to adjust the friction so that the conveying unit can be held in a position by means of the counterweight in conjunction with the friction, more particularly without further force exertion by means of the drive.

The counterweight has in particular a weight in the region of 150% to 250%, preferably 180% to 220% and particularly preferred of about 200% of the conveying unit. The weight of the conveying unit is determined without bulk goods and/or packaged goods in the conveying unit.

This has the advantage that through the configuration of the force transmission unit and the force deflection units by way of example as a block and tackle only a drive with a lower lift is required for the maximum substantially vertical movement of the conveying unit, if the block and tackle is designed accordingly. Such a drive is more cost-effective compared for example with a drive which has to have a lift substantially equal to the maximum vertical movement of the conveying unit.

It is particularly preferred if the counterweight is mounted on and/or in the housing and more particularly is vertically movable in the housing.

This has the advantage that no further devices are required to mount the counterweight in the device and the device is thus more cost-effective. The arrangement of the counterweight in the housing moreover has the advantage that the effects of weather on the movement of the counterweight can be minimized.

It is more especially preferred if the boom is horizontally rotatable and/or vertically pivotable.

By "rotatable" is meant in the sense of the present application the ability to rotate about at least 180° or multiples thereof.

By the term "pivotable" is meant in the sense of the present application the ability to pivot in the region of ±10° relative to the direction of gravity, preferably ±5°, and more particularly preferred ±3°.

The conveying unit can preferably be positioned along the boom.

This has the advantage of a more flexible positioning of the conveying unit relative to the transport device which is to be loaded and/or unloaded and in particular of a decoupling of the horizontal and vertical positioning of the conveying unit, which makes this more precise.

It is particularly preferred if the device is mounted movable for positioning of the device relative to the transport device.

This has the advantage that the device and thus the conveying unit can be positioned even better relative to the transport device and thus a more efficient loading and/or unloading can be reached.

It is particularly preferred if the conveying unit comprises a least one of the following units: chain conveyor, belt conveyor, screw conveyor, bucket conveyor, pneumatic conveyor, gripper unit.

The conveying unit preferably has at least one conveyor screw for conveying bulk goods which particularly for the use intended is mounted on the side facing the transport device.

By way of example during unloading and/or loading, the conveyor screw for conveying bulk goods is arranged in particular on the side facing the transport device. In other words, the conveyor screw during unloading and/or loading is situated in contact with the bulk goods in the transport device.

This has the advantage that in particular non-free-flowing bulk goods can be conveyed by means of the conveyor screw into the conveying unit for unloading the transport device. Even when loading a transport device with non-free-flowing bulk goods the use of such a conveyor screw can be advantageous since the bulk goods conveyed with the conveying unit into the transport device can be moved away from the conveying unit by means of the conveyor screw so that loading the transport device can take place more efficiently.

It is particularly preferred if the device has a conveyor line for discharging and/or supplying bulk goods into and/or out from the conveying unit. The conveyor line is designed in particular as a telescopic line.

This has the advantage that with vertical movement the length of the conveyor line can be adjusted so that bulk goods can be supplied and/or discharged further.

By way of example a worm screw or even a chain conveyor can be mounted in the conveyor line for transporting the bulk material along the conveyor line.

By the term "telescopic" is meant in the sense of the present application a line which can be adjusted in length.

It is more especially preferred if the device has a conveyor for discharging and/or supplying bulk goods into and/or out from the conveyor line. This conveyor is in particular mounted along the boom for conveying bulk goods from and/or into the device.

A further aspect of the invention is directed towards a method for conveying packaged goods and/or bulk goods out from and/or into a transport device. This method is carried out in particular by means of a device as described above. The method comprises the step of setting up a device which comprises a boom with at least one substantially vertically movably mounted conveying unit for conveying the packaged goods and/or the bulk goods, a drive for moving the conveying unit substantially vertically, and a force transmission unit. The device has a first fastening device and a second fastening device and/or at least a first and a second force deflection unit or arbitrary combinations thereof for the force transmission unit. With a use as intended the conveying unit and the drive are arranged between the first fastening device and the second fastening device and/or between the first and second force deflection unit or arbitrary combinations thereof, in relation to at least one direction defined along the force transmission unit. Following the setting up of the device the conveying unit is positioned substantially vertically relative to the transport device by means of the drive. The bulk goods and/or packaged goods are then conveyed out from and/or into the transport device.

This method is carried out substantially with the device described above and therefore has all the corresponding advantages.

The device preferably comprises an at least substantially vertically movably mounted counterweight which is connected to the drive and/or is arranged between the first fastening device and the second fastening device and/or between the first and the second force deflection unit or arbitrary combinations thereof. The counterweight is moved by means of the drive with the use as intended substantially vertically opposite the conveying unit during the positioning of the conveying unit.

The use of the counterweight has the advantages described above for the device.

A further aspect of the present invention is directed towards a method for equipping and/or converting a device for conveying packaged goods and/or bulk goods out from and/or into a transport device for producing a device as described above. The device which is to be equipped and/or converted, comprises an at least substantially vertically movably mounted conveying unit. The method is characterised by the installation of a force transmission unit. Furthermore a drive is optionally installed for connecting with the force transmission unit if the device still has no drive which is suitable for connecting with the force transmission unit in order to produce the device described above. Furthermore an installation takes place of a first and second fastening device and/or the first and the second force deflection unit or arbitrary combinations thereof. The steps detailed for this up to now can be carried out in any sequence. This is followed by connecting the force transmission unit to the installed or an already existing drive, the first and the second fastening device and/or the first and the second force deflection unit or arbitrary combinations thereof and to the conveying unit. This connection can be carried out in any sequence. The connection of the installed components must be carried out so that the conveying unit and the drive with the use as intended are arranged in relation to at least one direction defined along the force transmission unit between the first fastening device and the second fastening device and/or between the first and the second force deflection unit or arbitrary combinations thereof, wherein the conveying unit can be moved substantially vertically at least by means of the drive.

This method has the advantage that already existing devices from the prior art can be modified by means of this method in order to obtain a device according to the invention with the advantages described above.

Preferably, an installation takes place of an at least substantially vertically movably mounted counterweight which is thereby connected with the installed or the already existing drive and/or is arranged between the first fastening device and the second fastening device and/or between the first and the second force deflection unit or arbitrary combinations thereof.

Figure 2:
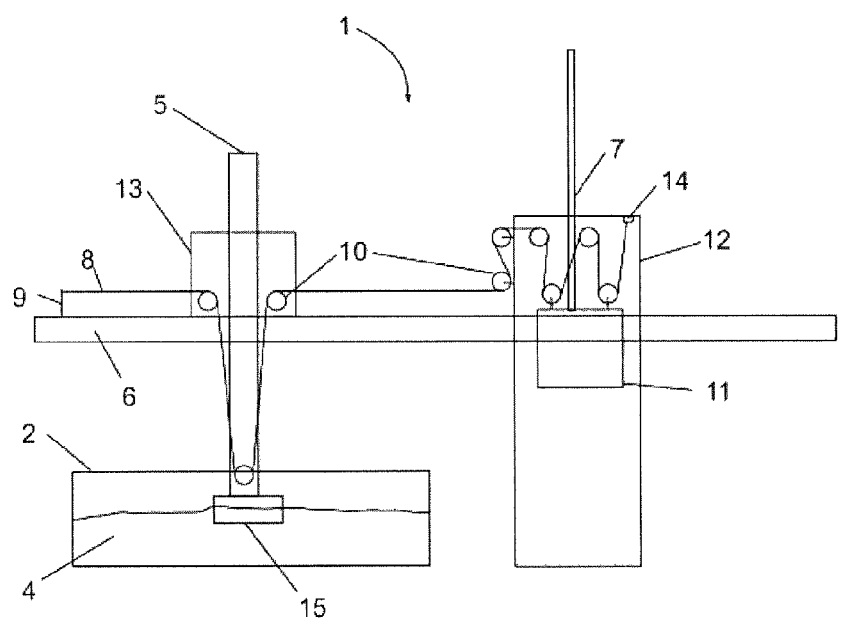
Figure 3:
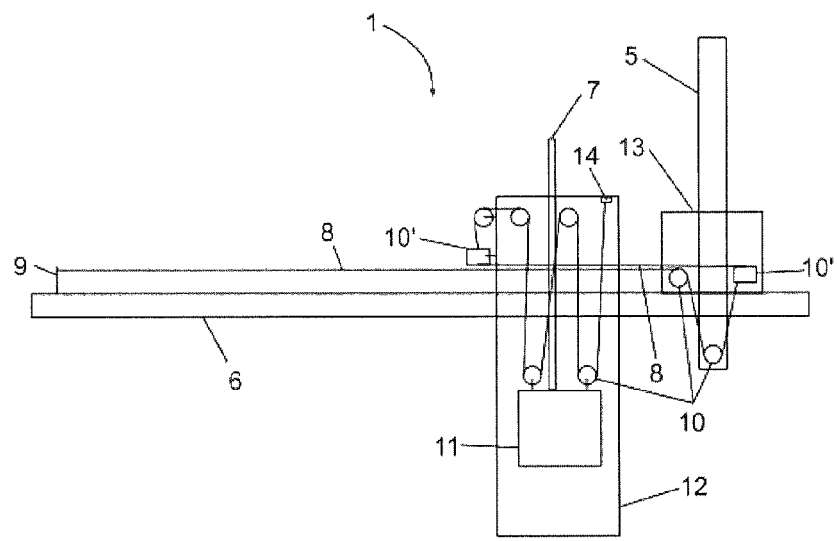
Figure 4:
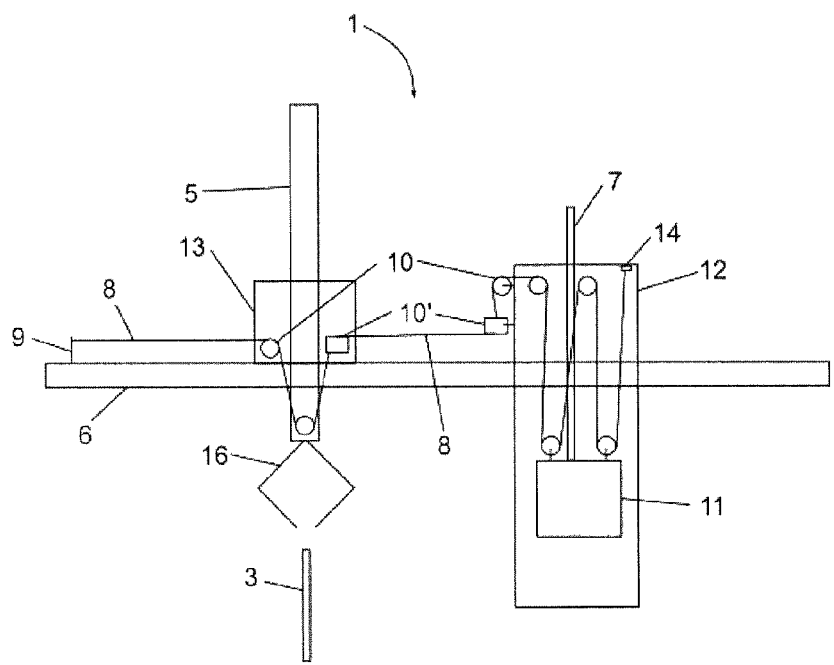
Figure 5:
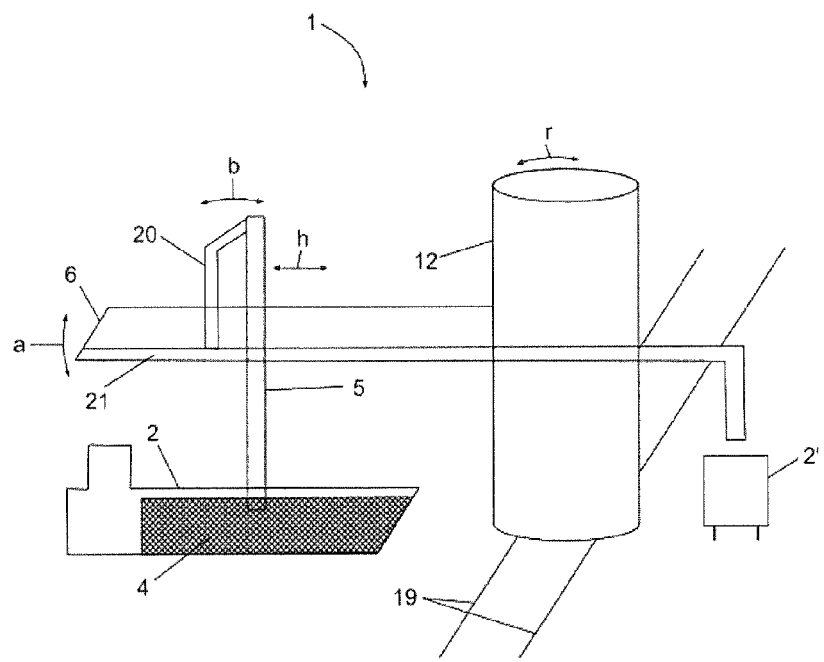
Figure 6:
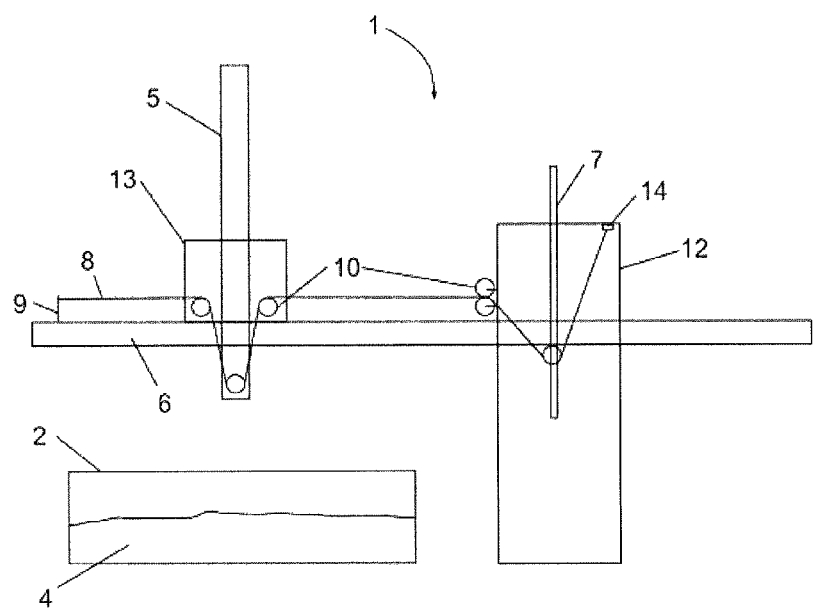
Figure 7:
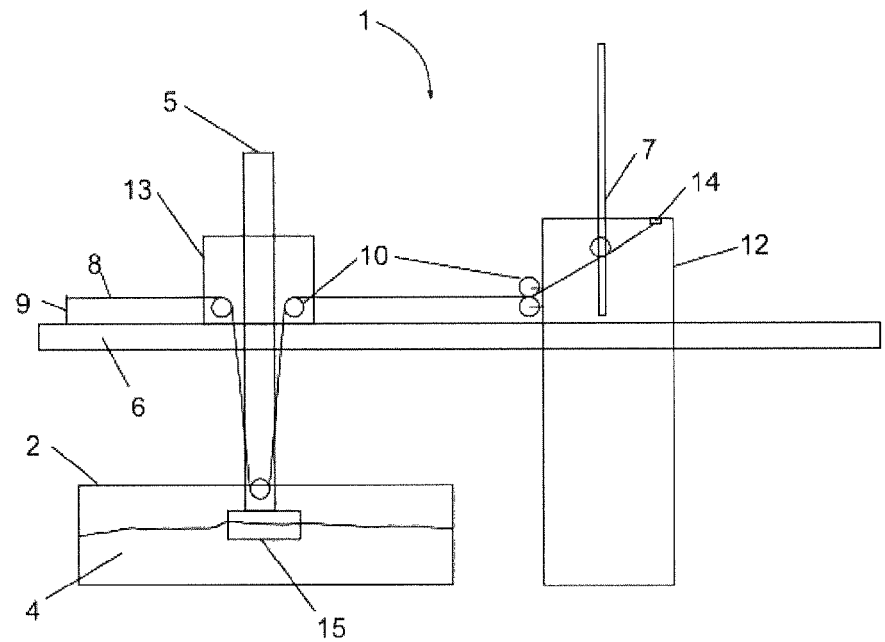
Figure 8:
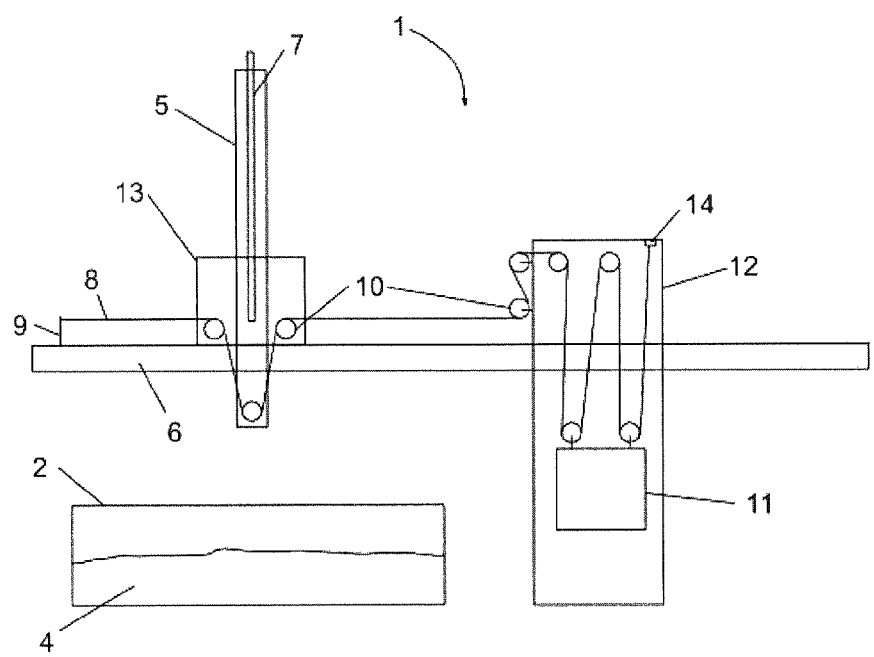
Figure 9:
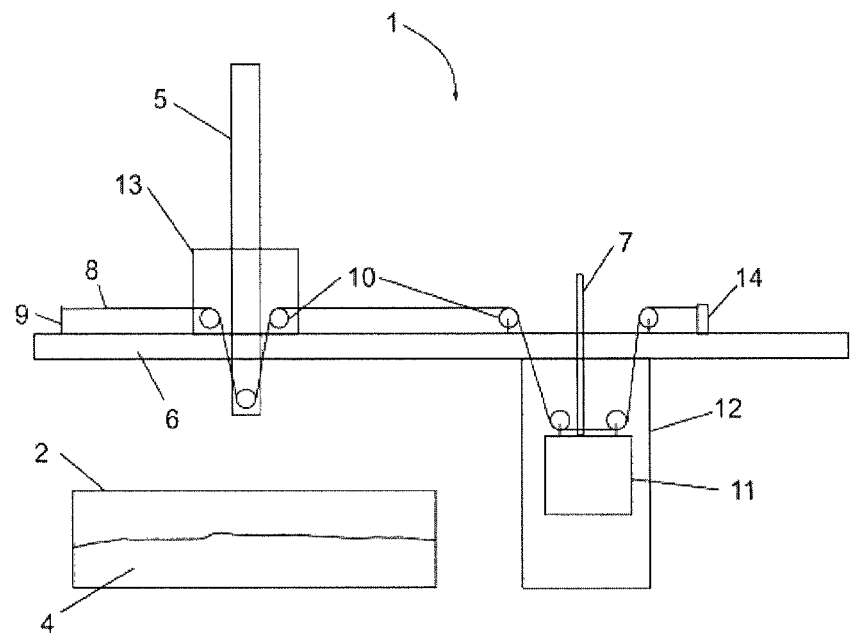
Figure 10:
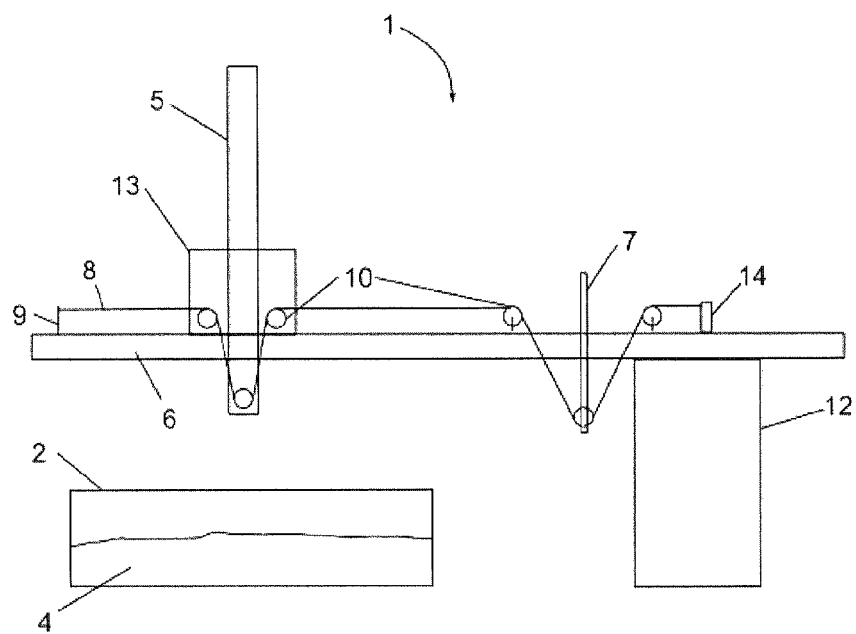
Figure 11:
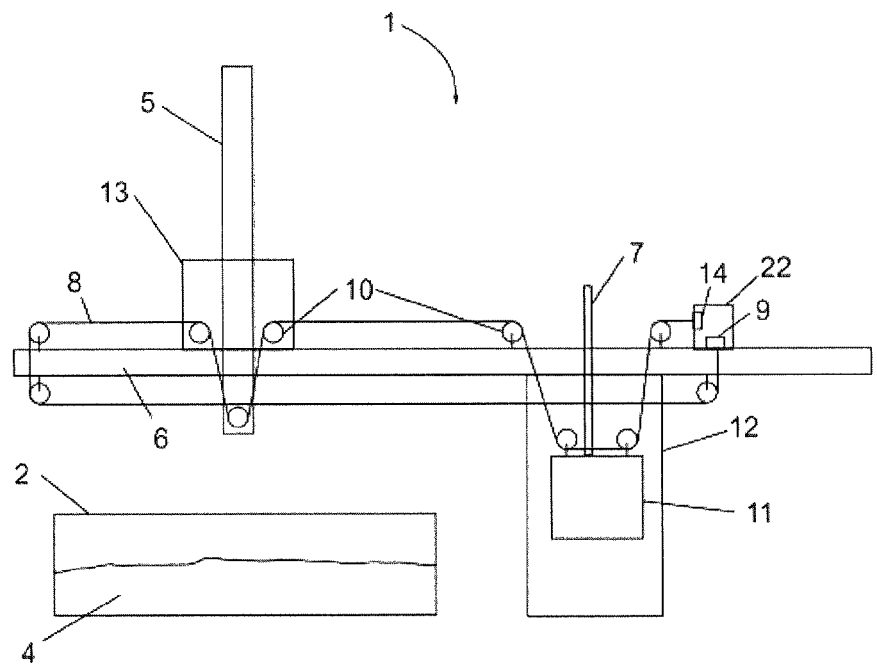
Figure 12:
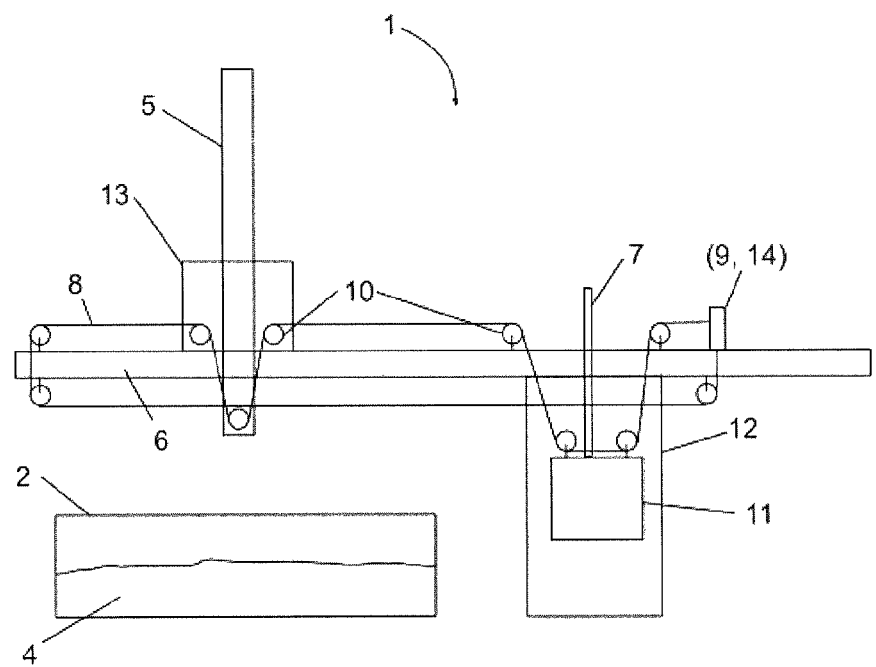
Figure 13:
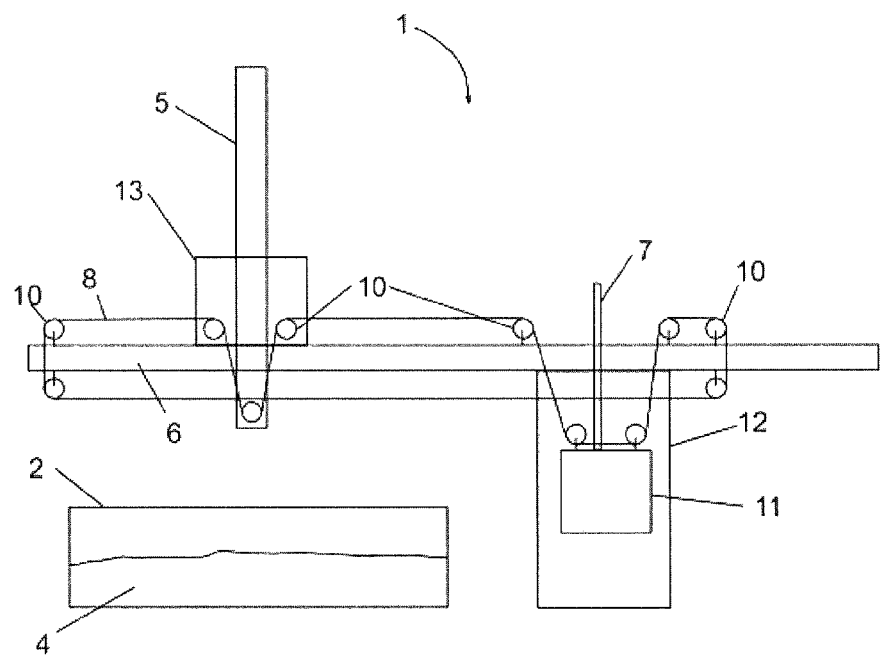

Further advantages of the device according to the invention and the method according to the invention will now be explained below in further detail for clearer understanding with reference to the drawings and embodiments without restricting the invention to these. The drawings show:

FIG. 1: diagrammatic illustration of a device according to the invention with a conveying unit in a first position;

FIG. 2: diagrammatic illustration of the device according to the invention according to FIG. 1 in a second position;

FIG. 3 diagrammatic illustration of an alternative device according to the invention in a first position;

FIG. 4: diagrammatic illustration of the alternative device according to the invention according to FIG. 3 in a second position with gripper arm;

FIG. 5: diagrammatic illustration of a device according to the invention for loading or unloading a ship;

FIG. 6: diagrammatic illustration of a further device according to the invention with a conveying unit in a first position without counterweight;

FIG. 7: diagrammatic illustration of the device according to the invention according to FIG. 6 in a second position;

FIG. 8: diagrammatic illustration of a device according to the invention with a drive mounted on a conveying unit;

FIG. 9: diagrammatic illustration of a further alternative device according to the invention;

FIG. 10: diagrammatic illustration of a device according to the invention without counterweight;

FIG. 11: diagrammatic illustration of an alternative device according to the invention with fastening housing;

FIG. 12: diagrammatic illustration of a further alternative device according to the invention with a common fastening device:

FIG. 13: diagrammatic illustration of a further alternative device according to the invention without fastening devices.

FIG. 1 shows in a diagrammatic illustration a device 1 according to the invention with a conveying unit 5 which is designed here as a vertical chain conveyor for bulk goods 4 which are located in a transport device 2, here a barge.

The device 1 has a framework 13 for holding and vertically aligning the conveying unit 5. The conveying unit 5 is attached to a boom 6 and can be positioned with the frame 13 along the boom. The boom 6 is fixedly connected to a housing 12 and can neither pivot nor rotate relative to the housing 12.

For the substantially vertical movement of the conveying unit 5 the device 1 according to the invention now has a system of a first fastening device 9 for a force transmission unit 8—here a one-piece cable. Furthermore the device 1 has force deflection units 10 which are designed here as guide pulleys. For a clearer overview only a part of the guide pulleys 10 was provided with this reference numeral. The device further has a counterweight 11 on which two guide pulleys 10 are fastened. The counterweight 11 is mounted in the housing 12 and is vertically displaceable, i.e. along the longitudinal axis of the housing 12. Furthermore the housing 12 has a second fastening device 14 for fastening the force transmission unit 8—i.e. the cable.

The force transmission unit 8 which is designed as a one-piece cable is thus connected on the one side to the first fastening device 9 and in the housing to the second fastening device 14. The conveying unit 5 is mounted between the counterweight 11 and the first fastening device 9 along the direction defined by the force transmission unit 8.

By means of a hydraulic drive 7 which can alternatively also be designed as an electric drive, it is possible to move the position of the counterweight 11 substantially vertically whereby the conveying unit 5 is moved substantially anti-parallel thereto. By this coupling of the movements of the counterweight 11 and the conveying unit 5 it is thus possible to be able to position the conveying unit 5 vertically in order to position this by way of example in the transport device 2 in order to convey the bulk goods 4 out from the latter.

The counterweight 11 has approximately 200% of the weight of the conveying unit 5 without bulk goods 4. Friction is adjusted along the force transmission unit 8 at the guide pulleys 10 and the bearing of the conveying unit 5 so that without any external force action by way of example by means of the drive 7 the conveying unit 5 and the counterweight 11 can be held substantially in a fixed position relative to one another. By designing the force transmission unit 8 as a block and tackle to which the counterweight 11 is connected, only a lift of the drive is necessary which is less than the maximum vertical position possible for the conveying unit 5. By designing the block and tackle with four supporting cables for the counterweight 11 and two supporting cables for the conveying unit 5 any displacement of the counterweight 11 over one travel path thus causes a displacement of the conveying unit 5 over double the travel path.

Through this configuration the positioning of the conveying unit 5 relative to the transport device 2 is accelerated and also the tracking of the vertical position of the conveying unit 5 is simplified since the barge can indeed fluctuate in the vertical position through the movement of the water.

A conveyor for discharging the bulk goods 4 from the conveying unit 5 via the boom 6 is not shown here.

FIG. 2 shows the device according to FIG. 1 in a second position of the conveying unit 5.

From here on and below the same reference numerals signify the same components in the figures.

As opposed to the device 1 according to FIG. 1 the conveying unit 5 according to FIG. 2 which here has a conveyor screw 15 for conveying bulk goods 4 into the conveying unit 5, is shown in a lowered position, i.e. displaced parallel to gravity. The counterweight 11 is correspondingly displaced substantially vertically anti-parallel thereto. The substantially vertical displacement of the conveying unit 5 has been effected through substantially vertical displacement of the counterweight 11 by means of a drive 7, which is an electric drive here.

During operation the conveying unit 5, which is here formed as a worm screw conveyor, is in contact with the bulk goods 4 by means of the conveyor screw 15. Bulk goods 4 are now conveyed by means of the conveyor screw 15 into the conveying unit 5 whereupon the bulk goods 4 are then conveyed vertically along the conveying unit 5 and are then discharged from the device 1 by means of a conveyor (not shown).

FIG. 3 shows an alternative device 1 according to the invention. As opposed to FIG. 1 it is possible here to position the conveying unit 5 along the entire length of the boom 6, i.e. either side of the housing 12.

For this the device 1 has in addition to the guide pulleys 10 guide elements 10' which enable the length of the force transmission unit 8 to be adjusted. This is necessary with a displacement of the conveying unit 5 on the boom 6 from the side facing the first fastening device 9 to the side remote from the first fastening device 9, since the length of the force transmission unit 8 varies here.

The first fastening device 9 is here formed as a hook for hanging the force transmission unit 8, as in FIGS. 1 and 2. The force transmission unit 8 has a corresponding element in order to fasten this on the hook.

The guide elements 10' comprise a system for adapting the length of the cable in order to ensure the required length of the force transmission unit 8. During operation for the substantially vertical displacement of the conveying unit 5 this possibility of adjusting the length of the force transmission unit 8 has to be stopped and the guide elements 10' must for this purpose be designed so that during operation of the device 1 they function like the guide pulleys 10 for the substantially vertical displacement of the conveying unit 5.

The force transmission unit 8 is formed here from segments, i.e. not in one piece.

In FIG. 4 the device 1 according to FIG. 3 is shown in a second position of the conveying unit 5 along the boom 6. As opposed to FIG. 3 the conveying unit 5 has a grab arm 16 for gripping the packaged goods 3.

The boom 6 is mounted rotatable about the longitudinal axis of the housing 12 in order to be able to transport the packaged goods 3 from the pick-up position into a set-down position. For this a displacement of the conveying unit 5 along the boom 6 can of course also be used.

FIG. 5 shows a diagrammatic illustration of a device 1. The conveying unit 5 is formed as in FIG. 1 and is substantially vertically displaceable with the mechanism explained in respect of FIG. 1.

The conveying unit 5 which is designed as a vertical chain conveyor, and has a conveyor screw (not shown here) as in FIG. 2, is located in a lowered position for conveying bulk goods 4 from the transport device 2, a ship, into a loading lorry 2'. For this the bulk goods 4 are conveyed by means of the conveying unit 5 into a discharge line 20 which is connected to a conveyor 21 in order to convey the bulk goods 4 along the conveyor 21 into the loading lorry 2'. The discharge line 20 is designed as a telescopic pipeline in order to be able to guarantee the connection for the transport of the bulk goods between the conveying unit 5 and the conveyor 21 in the event of a substantially vertical displacement of the conveying unit 5.

For maximum flexibility in order also to be able to reach hard-to-reach freight areas with the conveying unit, the boom 6 is capable of pivoting about the longitudinal axis of the housing 12 along the direction marked by a. The conveying unit 5 is displaceable along the boom according to arrow h and is pivotal along the direction according to arrow b relative to the longitudinal axis of the conveying unit 5. By designing the discharge line 20 as a telescopic pipeline this can compensate any such pivotal movement and can ensure the transport of the bulk goods 4 into the conveyor 21. With a displacement of the conveying unit 5 along the boom 6 the discharge line 20 is also moved along with the conveying unit 5 along the direction h.

The boom 6 is mounted rotatable about the housing 12 along the direction r. The housing is mounted on rails 19 in order to be able to achieve a translatory movement of the housing.

As an alternative to using rails 19 it is also possible to use wheels.

FIG. 6 shows a device 1 in a first position substantially according to FIG. 1. The device 1 has no counterweight however.

FIG. 7 shows the device 1 according to FIG. 6 in a second position. Here the conveying unit 5 has a conveyor screw 15 for conveying bulk goods 4.

FIG. 8 shows a device according to the invention according to FIG. 1. As opposed to FIG. 1 however the drive 7 is here mounted on the conveying unit 5.

FIG. 9 shows a device according to the invention according to FIG. 1. As opposed to FIG. 1 however the second fastening device 14 is attached to the boom 6. The boom 6 is mounted on the housing 12.

FIG. 10 shows a device 1 according to the invention wherein the drive 7 as well as the second fastening device 14 are mounted on the boom 6. The boom 6 is mounted on the housing 12.

FIG. 11 shows an alternative device 1 according to the invention with a fastening housing 22. The first fastening device 9 and the second fastening device 14 are mounted in the fastening housing 22 which is mounted on the boom 6. The force transmission unit 8 is formed substantially loop-shaped.

FIG. 12 shows a device 1 according to the invention according to FIG. 11. As opposed to FIG. 11 the device 1 here has no fastening housing. The device has just a common fastening device 9,14.

FIG. 13 shows an alternative device 1 according to the invention without fastening device. Instead of the fastening devices according to FIG. 10 the device 1 has additional force deflection units 10, here guide pulleys. A loop-shaped closed force transmission unit 8 is thereby formed.

The invention claimed is:

1. A device for conveying packaged goods and/or bulk goods from and/or into a transport device, said device comprising
   a boom with at least one substantially vertically movably mounted conveying unit for conveying the goods,
   a drive for producing substantially vertical movement of the conveying unit and
   a force transmission unit, wherein the device further comprises:
   a first fastening device and a second device selected from the group consisting of a second fastening device and at least one force deflection unit for the force transmission unit, wherein
   the conveying unit and the drive are arranged between the first fastening device and the second device in relation to at least one direction defined along the force transmission unit, the force transmission unit is designed so that the conveying unit is movable substantially vertically by the drive, and further comprising a substantially vertically movable counterweight connected to the drive and/or mounted between the first fastening device and the second device.

2. A device as claimed in claim 1, wherein the force transmission unit is selected from the group consisting of a cable, a rope, a chain or combinations thereof with guide elements.

3. A device as claimed in claim 1, further comprising a housing supporting at least one of said boom, drive, first fastening device, second device, and force deflection unit(s).

4. A device as claimed in claim 1 wherein the drive is mounted on and/or in the conveying unit.

5. A device as claimed in claim 1, wherein the counterweight is mounted on the housing.

6. A device as claimed in claim 1, wherein the boom is at least one of horizontally rotatable and vertically pivotable.

7. A device as claimed in one claim 1, wherein the conveying unit is positioned along the boom.

8. A device as claimed in claim 1, wherein the device is movably mounted relative to the transport device.

9. A device as claimed in claim 1, wherein the conveying unit comprises a device selected from the group consisting of chain conveyor, belt conveyor, screw conveyor, bucket conveyor, pneumatic conveyor, grab unit.

10. A device as claimed in claim 1, wherein the conveying unit has a least one conveyor screw for conveying bulk goods.

11. A device as claimed in claim 1, wherein the device has a conveyor line for discharging and/or supplying the bulk goods into and/or out from the conveying unit.

12. A device as claimed in claim 1, wherein the device has a conveyor for discharging and/or supplying bulk goods into and/or out from the conveyor line.

13. A method for conveying packaged goods and/or bulk goods from and/or into a transport device, comprising the following steps:

setting up a device comprising a boom with an at least substantially vertically movably mounted conveying unit for conveying the packaged goods and/or the bulk goods, a drive for moving the conveying unit substantially vertically and a force transmission unit, wherein the device has a first fastening device and a second device selected from the group consisting of a second fastening device and at least one force deflection unit for the force transmission unit, wherein the conveying unit and the drive are mounted between the first fastening device and the second device in relation to a direction defined along the force transmission unit, and wherein the device further comprises a substantially vertically movable counterweight which is connected to the drive and/or mounted between the first fastening device and the second device;

positioning the conveying unit substantially vertically by means of the drive relative to the transport device for conveying;

conveying the packaged goods and/or bulk goods from and/or into the transport device.

14. A method as claimed in claim 13, wherein the counterweight is moved by means of the drive substantially vertically opposite the conveying unit during the positioning of the conveying unit.

* * * * *